United States Patent
Schmidt

(10) Patent No.: US 9,184,692 B2
(45) Date of Patent: Nov. 10, 2015

(54) METHOD FOR CONTROLLING THE POWER SUPPLY OF AN ELECTRIC MOTOR

(75) Inventor: Alexander Schmidt, Donaueschingen (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 13/807,652

(22) PCT Filed: Jul. 4, 2011

(86) PCT No.: PCT/EP2011/061231
§ 371 (c)(1),
(2), (4) Date: Apr. 8, 2013

(87) PCT Pub. No.: WO2012/001176
PCT Pub. Date: Jan. 5, 2012

(65) Prior Publication Data
US 2013/0200824 A1 Aug. 8, 2013

(30) Foreign Application Priority Data

Jul. 2, 2010 (DE) .......................... 10 2010 030 885

(51) Int. Cl.
*H02P 1/00* (2006.01)
*H02P 3/00* (2006.01)
(Continued)

(52) U.S. Cl.
CPC .............. *H02P 31/00* (2013.01); *B60L 11/1853* (2013.01); *B60L 11/1861* (2013.01); *B60L 11/1864* (2013.01); *B60L 11/1875* (2013.01); *B60L 11/1879* (2013.01);
(Continued)

(58) Field of Classification Search
CPC .............. H01M 10/441; H01M 10/482; B60L 11/1864

USPC ........................................ 318/139; 701/29.1
See application file for complete search history.

(56) References Cited

U.S. PATENT DOCUMENTS 5,828,201 A  10/1998 Hoffman, Jr. et al.
7,212,934 B1 * 5/2007 Hall et al ........................ 702/76
(Continued)

FOREIGN PATENT DOCUMENTS

CN     2865021 Y    1/2007
DE     103 02 860 A1    8/2004
(Continued)

OTHER PUBLICATIONS

International Search Report corresponding to PCT Application No. PCT/EP2011/061231, mailed Sep. 2, 2011 (German and English language document) (7 pages).

*Primary Examiner* — Erick Glass
(74) *Attorney, Agent, or Firm* — Maginot, Moore & Beck LLP

(57) ABSTRACT

A method and electrical system for controlling the power supply of an electric motor, in particular the electric motor of a vehicle that can be electrically driven, includes a control device that controls the power supply of the electric motor by an energy store. The energy store comprises a plurality of modules that are exposed to stress due to repeated charging and/or discharging and undergo an aging process as a result of said stress. In order to decouple the service life of the energy store from the service life of a vehicle, for example, the control device controls the charging and/or discharging of at least two modules differently such that said modules exhibit a stress difference so as to selectively reduce the aging process of the module being exposed to less stress.

8 Claims, 2 Drawing Sheets

(51) Int. Cl.

| | |
|---|---|
| *H02P 5/00* | (2006.01) |
| *H02P 31/00* | (2006.01) |
| *B60L 11/18* | (2006.01) |
| *H01M 10/44* | (2006.01) |
| *H01M 10/48* | (2006.01) |
| *H02J 7/00* | (2006.01) |
| *H01M 10/625* | (2014.01) |
| *H01M 10/615* | (2014.01) |
| *H01M 10/6571* | (2014.01) |
| *H01M 10/6567* | (2014.01) |
| *H01M 10/613* | (2014.01) |

(52) U.S. Cl.
CPC ........... *H01M 10/44* (2013.01); *H01M 10/441* (2013.01); *H01M 10/48* (2013.01); *H01M 10/482* (2013.01); *H02J 7/0013* (2013.01); *H02J 7/0075* (2013.01); *H01M 10/613* (2015.04); *H01M 10/615* (2015.04); *H01M 10/625* (2015.04); *H01M 10/6567* (2015.04); *H01M 10/6571* (2015.04); *Y02T 10/7005* (2013.01); *Y02T 10/7044* (2013.01); *Y02T 10/7055* (2013.01); *Y02T 10/7061* (2013.01)

(56) References Cited

U.S. PATENT DOCUMENTS

| | | | |
|---|---|---|---|
| 8,103,401 B2 * | 1/2012 | Kubo et al. | 701/34.1 |
| 8,212,571 B2 * | 7/2012 | Emori et al. | 324/522 |
| 8,401,728 B2 * | 3/2013 | Kubo et al. | 701/29.1 |
| 8,649,935 B2 * | 2/2014 | Kubo et al. | 701/34.4 |
| 2003/0020334 A1 * | 1/2003 | Nozu | 307/109 |
| 2011/0094075 A1 * | 4/2011 | Lee et al. | 29/25.41 |
| 2011/0106220 A1 * | 5/2011 | DeGiorgio et al. | 607/72 |

FOREIGN PATENT DOCUMENTS

| | | |
|---|---|---|
| DE | 10 2008 009 568 A1 | 8/2009 |
| EP | 0 913 288 B1 | 7/2002 |
| JP | 11-289605 A | 10/1999 |

* cited by examiner

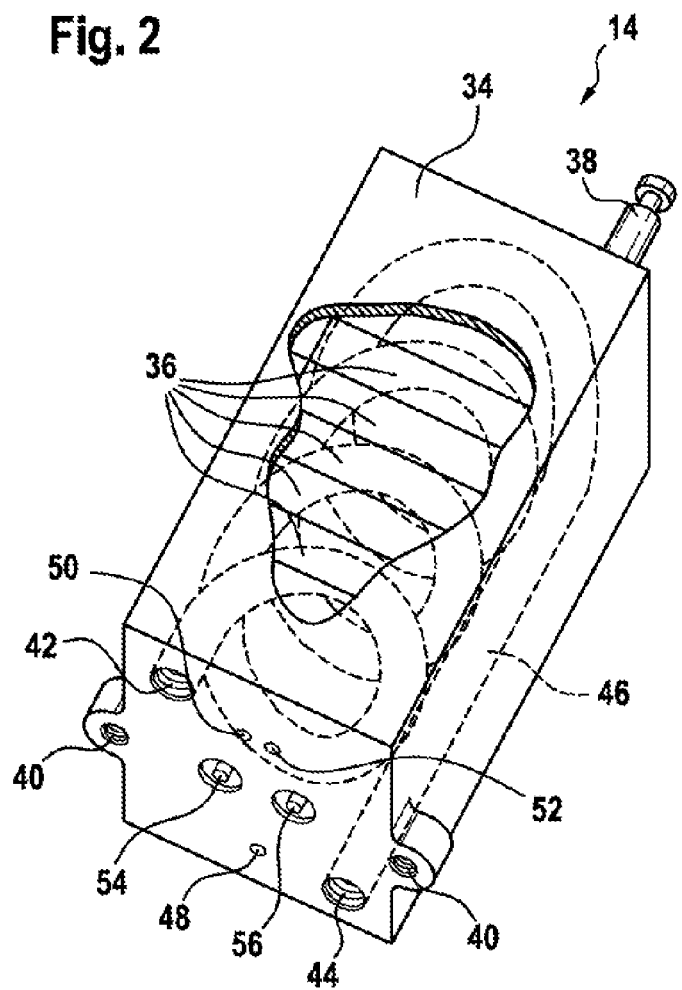

METHOD FOR CONTROLLING THE POWER SUPPLY OF AN ELECTRIC MOTOR

This application is a 35 U.S.C. §371 National Stage Application of PCT/EP2011/061231, filed on Jul. 4, 2011, which claims the benefit of priority to Serial No. DE 10 2010 030 885.4, filed on Jul. 2, 2010 in Germany, the disclosures of which are incorporated herein by reference in their entirety.

BACKGROUND

The present disclosure relates to a method for controlling the power supply of an electric motor, in particular the electric motor of a vehicle that can be electrically driven.

In order to reduce automobile emissions, increased emphasis is currently being placed on developing drive concepts for electrically driven vehicles such as pure electric vehicles or hybrid electric vehicles (HEV). Operating electric vehicles using motors and generators requires having an electrical energy store in the vehicle.

Particularly when supplying power to electric vehicles, the energy store is frequently discharged and then recharged. Repeatedly discharging and charging the energy store stresses it, causing it to undergo an aging process after a certain period of time, which diminishes its performance and capacity over time. The end of the service life may therefore be marked by a significant reduction in performance and capacity, creating the necessity of a costly replacement of the energy store.

A method is therefore known from EP 0 913 288 B1 for maintaining the charge capacity of traction battery modules of a hybrid electric vehicle. In this method, while the vehicle is idle or the ignition is switched off, the energy store is maintained by fully charging only a single module and then partially discharging it.

SUMMARY

The object of the disclosure is a method for controlling the power supply of an electric motor, in particular the electric motor of a vehicle that can be electrically driven, wherein a control device controls the power supply of the electric motor via an energy store, and wherein the energy store comprises a plurality of modules, which experience stress through repeated charging and/or discharging and undergo an aging process as a result of the stress. According to the disclosure, it is envisaged that the control device controls the charging and/or discharging of at least two modules differently such that these modules have a stress difference, in order to selectively reduce the aging process of the module that is subjected to less stress.

According to the disclosure, the electric motor is supplied with power via an energy store that is built from a plurality of modules. As the result of the control device controlling the charging and/or discharging of at least two modules differently such that these modules have a stress difference in order to selectively reduce the aging process of the module that is subjected to less stress, it is possible to selectively influence the service life of individual modules or a group of modules.

In addition to the so-called calendric aging of energy stores, which occurs through mere storage and without being used, energy stores particularly age as a result of the stress caused by repeated charging and discharging. According to the disclosure, the modules undergo an aging process of varying intensity, meaning that at least one module ages less than the other modules. In other words, the control device controls the modules selectively such that the aging process of individual modules or a plurality of modules is selectively reduced, while other modules may be more heavily stressed. In this way, a spread in the aging process of the modules is achieved. The replacement of individual modules or a group of modules is thus necessary at an earlier time than the replacement of other modules.

Thus, according to the disclosure, continuous replacement of individual modules or a plurality of modules is possible and necessary. Therefore, the modules that are more heavily stressed, or the module that is more heavily stressed, can, for example, be replaced within the scope of an annual service interval at a reasonable cost. Furthermore, it is not necessary to replace the entire energy store at a specific time, since a conventional energy store does not attain the typical service life of a vehicle of approximately 10 to 15 years or several hundred thousand kilometers. It is thus feasible and economically reasonable to replace individual modules or a few modules comparatively inexpensively and without any problems, even if the vehicle has reached an advanced age. This makes it possible to decouple the economical service life of an electrically driven vehicle from the service life of the entire energy store and thus significantly extend it.

In addition, the use of a selectively controlled aging process of individual modules prevents the performance of the entire energy store from dropping sharply at any particular time. Rather, the deterioration experienced by the individual modules is continuously staggered in time such that, on average, there is comparable deterioration and thus consistently uniform performance at any given time.

By successively replacing individual modules as necessary according to the disclosure, it is also possible to adapt the energy store to the current state of development of the modules on a continuing basis by constantly replacing an older module with a new, current module. Thus, different cell chemistries or different cell generations can be combined in one energy store.

It is not necessary to use individual modules that are exactly matched to the relevant energy store. In fact, it is conceivable that the design characteristics of the individual modules can be standardized across manufacturers. This will result in a reduction in manufacturing costs, which will make both the individual modules and the energy store as a whole more cost-effective. This will make it possible to increase the acceptance of electrically powered vehicles on the market.

Another advantage of the method according to the disclosure is that a complex balancing of the individual cells as components of the modules is not necessary while in operation. Here, balancing the cells means balancing the charging state and therefore also the quiescent terminal voltage of individual cells to each other. According to the prior art, this generally takes place before interconnection during production and during operation if necessary, in order to compensate for different aging effects on the cells.

In addition, this makes it possible to perform the aging process for the individual modules in the desired application without additional work steps. Thus, the end user does not notice this, but rather, the control device controls only the source of the required power, if it is needed anyway within the scope of using the electric motor.

Within the scope of the disclosure, a stress difference here means the difference in the currents flowing through the modules. A stress difference can comprise both the duration and intensity of charging or discharging. The magnitude of the stress difference refers to the average value that occurs during a complete charging or discharging process. Depending on the current requirement of the electric motor, transient stress differences are possible that are significantly greater or even significantly smaller than, for example, at full load.

Within the scope of a preferred embodiment, the modules are respectively arranged in a module circuit and connected in parallel. This is an especially advantageous and simple arrangement for controlling the modules differently. In this case, each of the modules should provide a sufficient voltage. Suitable voltage values particularly fall in the range of 400 V. This can be implemented by constructing the modules from individual cells, for example, by connecting 100 cells, each having a voltage of 4 V, in series in each module. In this case, the modules connected in parallel are able to provide sufficient current or sufficient electrical power to drive the electric motor. In particular, suitable power levels fall between 20 kW and 500 kW.

Within the scope of another embodiment, the different level of charging and/or discharging of at least two of the modules is controlled by setting a resistance value of at least one variable resistor arranged in the module circuit. This is a particularly simple and effective way to stress the modules differently. By setting the resistance value of at least one variable resistor, the current flow through individual module circuits can be selectively increased or decreased, and so the charging and/or discharging of individual modules can be precisely controlled. It is particularly preferable to set the resistance value such that a stress difference does not exceed a value of 20%. In particular, the stress difference falls in a range from ≥10% to ≤20%.

Another advantage of using variable resistors is that these resistors can be similarly used to balance potentially different voltage levels of the individual modules by means of a different resistance value. The method according to the disclosure can thus be used in a highly flexible manner.

In addition, the resistors have a safety function. Should a short circuit occur in one of the modules, it is possible to achieve an interruption of the circuit flow in the respective module circuit through a corresponding adjustment of the resistor. It is therefore possible effectively to prevent the other modules from shifting their output into the short-circuited module circuit, thus bringing about a safety-critical condition.

In any case, the heat generated by the resistors can be used to improve the cold start of the energy store by warming the energy store or the respective modules with the heat generated in the resistor.

Within the scope of another advantageous embodiment of the present disclosure, the different level of charging and/or discharging of at least two of the modules is checked by the control device via an ammeter arranged in each module circuit and/or via a voltage measurement in the modules. It is therefore possible to react immediately to potential disturbances that affect the different level of charging and/or discharging. A control loop can thus preferably be formed that performs selective stressing as desired. It is therefore particularly preferred to readjust the resistance value based on data obtained from a current measurement and/or a voltage measurement.

Within the scope of another embodiment, the control device takes into account the varying state of aging of the individual modules when forming the stress difference. The actual state of aging can thus be factored in when selecting the stress on the modules or the module to be stressed. It is therefore possible to avoid errors that occur when individual modules have a disproportionately high, unanticipated age and thus interfere with the targeted aging process. In this way, the control device does not solely control the stress on the individual modules strictly according to a predefined model, but can rather react to the actual state of aging of the individual modules. This can be important, for example, if a module ages more quickly or more slowly than originally anticipated and desired, which can be caused, for example, by a fault in the electrical system, or by manufacturing errors or damage to the individual modules or the total energy store.

In doing this, it is advantageous if the control device evaluates data relating to the voltage, the temperature, and/or the current of the modules, and particularly calculates the capacity and/or the inner resistance of the modules, in order to take into account the state of aging of the modules. This data makes it possible to draw particularly reliable conclusions about the state of aging of the individual modules.

Within the scope of another advantageous embodiment of the present disclosure, modules are used that have the same nominal voltage. Here, the nominal voltage means the average voltage of a module during a constant-current discharge, in particular within a period of one to three hours, and is a characteristic value for a module or for its cell chemistry. Thus, the resistors that are preferably provided are basically used only to accomplish the selective stressing or aging. In particular, the individual modules have an identical design. This allows the design of the energy store and thus of the electrical system to be particularly simple.

Furthermore, the disclosure relates to an electrical system, in particular an electrical system for controlling the power supply of a vehicle that can be electrically driven, comprising an energy store, in particular for driving an electric motor of a vehicle, wherein the energy store comprises a plurality of modules that are removably fastened and connected in parallel and each arranged in a module circuit, wherein a resistor having a variably adjustable resistance value is arranged in each module circuit, and comprising a control device that is suitable for adjusting the resistance value in a targeted manner.

With such an electrical system, it is possible to carry out the method according to the disclosure in a particularly suitable way that brings about the mentioned advantages relating to the method according to disclosure.

BRIEF DESCRIPTION OF THE DRAWINGS

Other advantages and advantageous embodiments of the objects according to the disclosure are illustrated by the drawings and explained in the following description. It should be noted that the drawings are only of a descriptive nature and are not intended to restrict the disclosure in any way. In the drawings:

FIG. 2 shows a partially cut-away view of a module for an energy store that can be used according to the disclosure.

DETAIL DESCRIPTION

Figure 1:
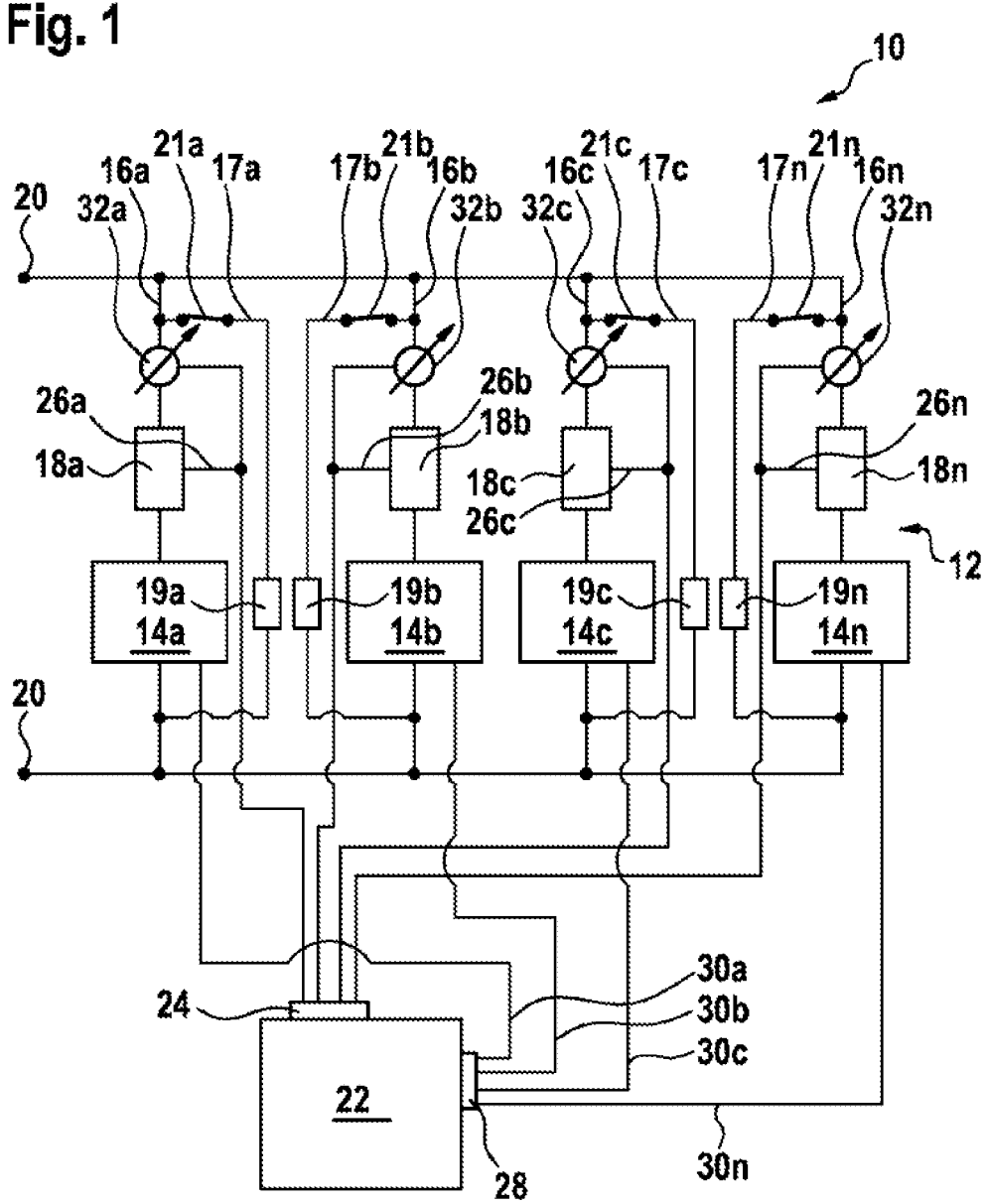
FIG. 1 shows an electrical system according to the disclosure for carrying out the method according to the disclosure.

The disclosure relates to a method for controlling the power supply of an electric motor. In addition, the disclosure relates to an electrical system 10 with which the power supply of an electric motor, in particular the electric motor of a vehicle that can be electrically driven, is controlled.

In FIG. 1, an electrical system 10 according to the disclosure for supplying an electric motor with power is shown. The electrical system 10 can be used for any type of electric motor. However, the description below is not limited to the electric motor of a vehicle that can be electrically driven. Thus, the system 10 according to the disclosure is preferably arranged in a vehicle that at least temporarily obtains at least a portion of the driving torque via at least one electric motor, and serves to drive the vehicle. This vehicle can, for example, be a pure electric vehicle as well as a hybrid electric vehicle (HEV).

The electrical system 10 comprises an electrical energy store 12. In particular, the electrical energy store 12 is a traction battery or an accumulator that supplies the electric motor with energy by discharging. The energy store can simultaneously be recharged, for example, via energy generated during braking. The energy store 12 thus serves to drive an electric motor, in particular to drive a vehicle that can be electrically driven, and comprises a plurality of modules 14. According to FIG. 1, the energy store comprises four modules 14a-n. However, this number is not restrictive; rather, more or fewer modules 14 are possible in the electrical system 10. The modules 14 are, for example, removably fastened to a base support and/or to each other, and can thus be replaced without any problem. The modules 14 are preferably respectively located in a module circuit 16, wherein the individual module circuits 16a-n are preferably connected in parallel, as shown in FIG. 1.

The modules 14a-n preferably have the same nominal voltage. This nominal voltage or terminal voltage of the modules 14 is sufficient for powering the electric motor. The nominal voltage of the modules 14 preferably falls in a range from 12 V to 1500 V, in particular at 400 V. By connecting a plurality of modules 14a-n in parallel, it is possible to provide a sufficiently large amount of current or sufficient electrical power. Suitable power values that should be attained fall in a range comparable to that of a combustion engine, for example, in a range from 20 kW to 500 kW, a cruising range of at least 100 km also being advantageous.

In addition, a variable resistor 18a-n is preferably respectively provided in the module circuits 16a-n, with which resistance values can be variably adjusted, in order to stress the modules 14a-n selectively or to induce increased aging, as described below.

A power terminal 20 is provided in order to connect the energy store 12 to the electric motor. The energy store can particularly be connected to the on-board electrical system of a vehicle via the power terminal 20. Here, the on-board electrical system of a vehicle means the network over which the electric motor is supplied with power. In particular, depending on the design of the electric motor, a power electronic circuit can be provided if required, which converts the direct current generated by the energy store 12 into alternating current.

The electrical system 10 furthermore comprises a control device 22, which controls the power supply to the electric motor via the energy store 12. The control device 22 is thus also designated as a battery management system and regulates the supply of current or electrical power to a load such as the on-board electrical system of a vehicle in response to a requirement for power. In order to control the power supply of the electric motor, the control device 22 has a control terminal 24 via which the control device 22 is connected to the variable resistors 18. The connection between the control terminal 24 and the variable resistor 18 is advantageously established via a control circuit 26.

In order to selectively control the service life of the individual modules 14a-n and thus to decouple the service life of the energy store from that of the vehicle, the control device 22 can control the charging and/or discharging of at least two modules 14a-n differently such these modules 14a-n have a stress difference, in order to selectively reduce the aging process of the module that is subjected to less stress. For example, this is possible if the control device 22 activates the variable resistors 18a-n, in which case it selectively adjusts the resistance values of the resistors 18a-n.

If, for example, the resistance value of the resistor 18a is set very low, whereas the resistance values of the resistors 18b-n are set very high, a comparatively high load current can flow through the module circuit 16a, whereas the current flow of the load current through the module circuits 16b-n is limited. Therefore, the module 14a is comparatively heavily discharged and thus more highly stressed, whereas the modules 14b-n are spared. The resistance values can preferably be set to between 0 ohms and a value that interrupts the current flow, and is here designated as infinite. In particular, the resistance values are to be set such that an average stress difference of less than 20% results.

Alternatively, it is possible particularly with a discharged module 14a to set the resistance value of the resistor 18a comparatively high, in particular to infinity, so that a current flow of the load current is interrupted. It is thus possible practically not to charge or discharge the module 14a, making an additional charging or discharging process impossible during use. Through such a repeated selective omission of at least a portion of a charging or discharging process of a least one module 14a, this module can be spared in comparison to other modules 14b-n, whereas the other modules 14b-n are subjected to greater stress and experience greater aging. In addition to adjusting a variable resistor 18a, it is of course possible to do this using a switch to interrupt the corresponding module circuit 16a.

It is of course possible to selectively subject only individual modules 14a or else a predetermined group of modules 14a-n to a high or low level of stress. In addition, it is possible to select the intensity of the stress or the level of the difference in stress. It is thus possible to select the aging process for individual modules 14a or for a group of modules 14b-n. However, a total of at least two modules must have a stress difference.

Within the scope of the method according to the disclosure, it is possible for the selective stressing of the modules 14a-n to be carried out by the control device according to a predetermined model, in order to achieve a predetermined aging process for the individual modules 14a-n and thus a service life with a predetermined and desired spread.

However, in order to be able to reliably maintain the desired aging process for the modules 14, the control device 22 has a data connection 28. The control device 22 is connected to the modules 14a-n via the data connection 28 or via data circuits 30a-n. The control device 22 can thus obtain voltage and temperature information for the individual modules 14a-n and derive values from them such as the inner resistance and/or the capacity, by means of which suitable data is obtained relating to the state of aging of the modules 14. The control device 22 therefore advantageously comprises an evaluation unit that calculates the state of aging of the modules from current data, voltage data, temperature information, and/or the inner resistance and capacity of the modules which have not yet aged. This can, for example, be carried out according to a predetermined model that is stored in the control device 22, in particular depending on the module type. The control device 22 can thus take into account the actual state of aging of the individual modules 14a-n when activating the resistors 18a-n and, for example, react to relatively and/or undesirably rapid aging. If a module 14a ages too rapidly, the control device 22 can then stress this module 14a more heavily, so that it experiences an intensified aging process, or the control device 22 can spare it, in order to slow down the aging process. It is thus possible to maintain the desired spread of the service life across the individual modules 14a-n as desired, independent of disturbances.

In addition, by providing feedback from the control device 22 and the module 14a-n, the user of the energy store, in particular the driver of the electrically driven vehicle, can be notified if one or more modules 14a-n has reached a predetermined state of aging. An indication for each selectable state of aging can be provided so that the user can be made aware of the impending necessity of replacing one or more modules 14. Furthermore, an indication can be provided to the user if one or more modules 14a-n is no longer able to provide sufficient power and/or capacity. For example, this may occur as the result of aging effects or in the event of other malfunctions.

It is also advantageous if ammeters 32a-n are arranged in the respective module circuits 16a-n. These ammeters 32a-n are able to measure the current flowing in the respective module circuit 16a-n and thus also provide information about the state of aging of the battery. In addition, based on the current measurement, it is possible to check the setting of the resistance value. If, for example, additional resistance has formed or the resistor does not work properly in the module circuit 16, it is thus possible to create a control loop through which the control device 22 keeps the stress on the modules 14 constant, despite any possible disturbances. To do this, the ammeters 32a-n are advantageously connected to the control device 22 via the data circuits 30a-n or via separate data circuits.

In addition, the electrical system 10 can have comparable variable resistors 19 along with the resistors 18, which are arranged in a respective parallel circuit 17 connected to the module circuit 16. These variable resistors 19 can be used to balance the individual modules 14a-n or their cells, that is, to align the charging state or the terminal voltage of the individual modules 14a-n to each other in the desired manner. During the balancing operation, the resistor 18a connected in series to the module 14a is preferably set to its maximum value, in particular to infinity, so that adjacent modules 14b-n are excluded from this operation. A switch 21 is advantageously arranged in the parallel circuit 17 for interrupting the current flow. In an alternative embodiment, the resistors 19 can also can be implemented as capacitive or inductive components so that at least a portion of the balancing energy can be fed back into the electrical system or into the modules 14.

In FIG. 2, an exemplary module 14 is shown, which is suitable for an electrical system 10 according to the disclosure or for use in a method according to the disclosure. The module 14 comprises a housing 34 in which a plurality of functional units or cells 36 are arranged. Because of their high energy density compared to other battery systems, lithium-ion cells are favored for use according to the disclosure, each module 14 preferably comprising only one cell type.

The module 14 can have a safety switch 38 (safety plug) for immediately disconnecting the voltage. Thus, if a fault occurs in the electrical system 10 and/or when performing maintenance work, the voltage in the energy store 12 can immediately be taken to zero, making it possible to reduce the hazard potential with respect to damage to the electrical system 10 as well as personal injuries. In addition, such a safety switch 38 can facilitate the replacement of individual modules 14.

In order to facilitate the replacement of individual modules 14, the module 14 has a connection to the overall store or energy store 12 particularly on its housing 34 that can be quickly disconnected. This connection can, for example, be formed as a plug connection or a screw connection 40, in order, for example, to fasten the module 14 to a base support and/or to another module 14.

Furthermore, the module 14 comprises an input 42 and an output 44 for a climate control fluid for providing temperature equalization. In order to conduct the fluid in the module 14, suitable ducts 46 are also arranged inside the housing 34 and connected to the input 42 and the output 44. In particular, in order to control the introduction of the climate control fluid, a measuring connection 48 is also provided for making a temperature measurement. In an alternative embodiment, the climate control fluid could also be conducted around the module 14, in which case the climate control fluid could then be conducted via a plurality of ducts directly to the module surface.

The module 14 has measuring connections 50, 52 for making a voltage measurement, particularly for making a connection to the control device 22. They are, for example, denoted as sens+ and sens− connections. With these connections, it is possible to measure the voltage, which can be used to calculate the resistance value of the resistor 18 to be adjusted. The resistor 18 can be arranged inside the housing 34 or else outside the housing 34. When using resistors 18, it is essential for a resistor 18 to be associated with each module circuit 16.

Finally, the module has electrical connectors 54, 56 for providing power output, which are connected to the power terminal 20. These connectors can also be used for performing voltage measurements.

The invention claimed is:

1. A method for controlling a power supply of an electric motor, comprising:
controlling the power supply of the electric motor with a control device, the power supply having an energy store including a plurality of modules electrically connected together in parallel and configured to provide a current to the electric motor, each module having an average current during at least one of charging and discharging; and
controlling the at least one of charging and discharging of at least two modules with the control device such that the average currents of the at least two modules are different, the controlling of the at least one of charging and discharging further comprising:
modifying a resistance value of at least one variable resistor of the power supply, the at least one variable resistor being configured to control the average current of at least one of the at least two modules.

2. The method as claimed in claim 1, the modifying further comprising:
modifying the resistance value of the at least one variable resistor such that the difference between the average currents of the at least two modules does not exceed a value of 20%.

3. The method as claimed in claim 1, further comprising:
measuring the difference in the average currents of the at least two modules with the control device via at least one of an ammeter and a voltage measurement.

4. The method as claimed in claim 3, the controlling of the at least one of charging and discharging further comprising:
modifying a resistance value of at least one variable resistor of the power supply based on the measured difference in the average currents of the at least two modules, the at least one variable resistor being configured to control the average current of at least one of the at least two modules.

5. The method as claimed in claim 1, the controlling of the at least one of charging and discharging further comprising:
evaluating at least one of a capacity and an inner resistance of the at least two modules, controlling the at least one of charging and discharging of at least two modules with reference to the at least one of the capacity and the inner resistance.

6. The method as claimed in claim 5, the evaluating further comprising:
   measuring at least one of a voltage, a temperature, and a current of the at least two modules to determine the at least one of the capacity and the inner resistance.

7. The method as claimed in claim 1, wherein the at least two modules have the same nominal voltage.

8. The method as claimed in claim 1, wherein the electric motor is an electric motor of a vehicle configured to be electrically driven.

\* \* \* \* \*